Patented Apr. 18, 1944

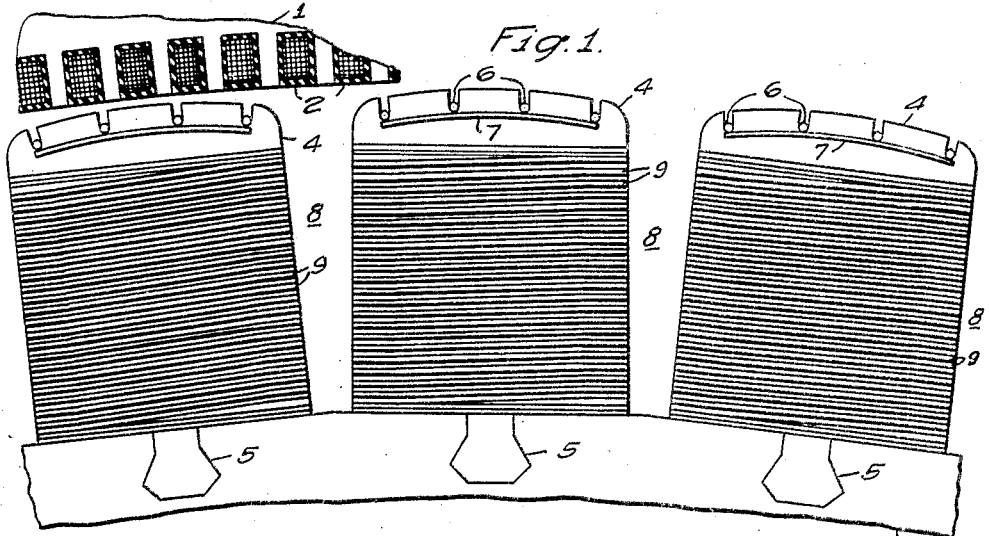
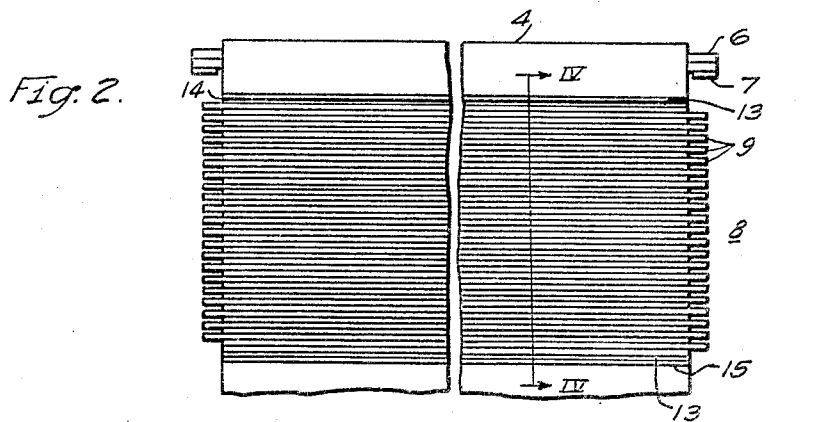
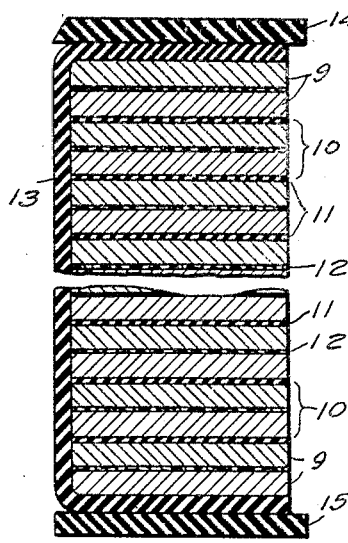
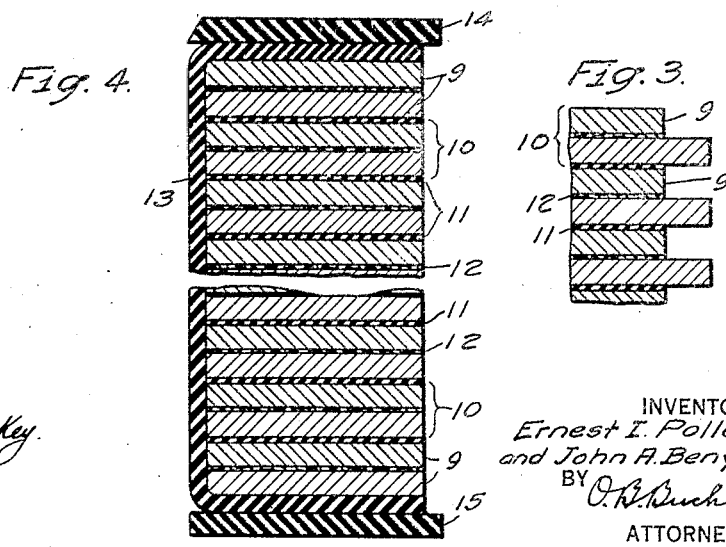

2,347,063

UNITED STATES PATENT OFFICE 2,347,063

FIELD WINDING FOR DYNAMOELECTRIC MACHINES

Ernest I. Pollard, Wilkinsburg, and John A. Benyak, Homeville, Pa., assignors to Westinghouse Electric & Manufacturing Company, East Pittsburgh, Pa., a corporation of Pennsylvania Application February 10, 1943, Serial No. 475,384

6 Claims. (Cl. 171—252)

The present invention relates to the field windings of dynamo-electric machines and, more particularly, to an improved field coil for use in large synchronous generators.

The field coils of salient-pole synchronous dynamo-electric machines usually consist of copper strap conductors wound edgewise, and it is fairly common practice to improve the ventilation of such coils by extending some of the turns beyond the others at the ends of the coil to serve as cooling fins. This is readily done by making these extended turns longer than the others in the direction of the longitudinal axis of the pole piece when the coil is wound, and this arrangement provides very effective cooling since the extended turns which serve as cooling fins are bare copper, so that there is a maximum radiation of heat from them. In many cases, such field coils consist of a relatively large number of turns, and only every third or fourth turn is extended, so as to provide sufficient spacing between the extended turns to permit an adequate flow of ventilating air between them. In some types of synchronous machines, however, such as large, low-speed, waterwheel-driven generators, the field coils often consist of relatively few turns of heavy strap conductors which may be as much as one-quarter inch to one-half inch in thickness. The ventilation of such coils presents a more difficult problem, since even if every other turn is extended to serve as a cooling fin, there is still not sufficient ventilating surface because of the relatively few turns and the thickness of the conductors. The ventilating surface could, of course, be increased by brazing, or otherwise securing, a thin cooling fin to the end of each turn, but such an arrangement is not very practical because of the difficulty of providing brazed joints which would withstand the large centrifugal forces to which they would be subjected during operation of the machine.

The principal object of the present invention is to provide improved ventilation for the field windings of large, salient-pole, synchronous dynamo-electric machines.

Another object of the invention is to provide a field coil for large, salient-pole, synchronous generators in which, in effect, each turn of the coil has a cooling fin at each end of the pole, but which does not require any separate cooling fins or brazed connections, and in which the extending portions or fins of adjacent turns are spaced far enough apart to permit an adequate flow of ventilating air between them.

A more specific object of the invention is to provide a field coil for large, salient-pole, synchronous generators which is composed of two strap conductors wound together as a two-ply conductor, with the two plies displaced from each other so that one ply extends beyond the other at each end of the coil to serve as a cooling fin.

The invention will be more fully understood from the following detailed description, taken in connection with the accompanying drawing, in which:

Figure 1 is a fragmentary plan view of a large, vertical-shaft synchronous generator;

Fig. 2 is a side elevation of a single pole piece with the field coil in place on it;

Fig. 3 is a fragmentary, enlarged longitudinal sectional view at one end of the field coil; and Fig. 4 is a transverse section of one side of the field coil on an enlarged scale, approximately on the line IV—IV of Fig. 2.

The invention is shown in Fig. 1 as embodied in the field winding of a large, waterwheel-driven synchronous generator having a stator member 1 with a suitable stator winding 2 placed in peripheral slots in the usual manner. The generator also has a rotor or field member which includes a rotor spider 3 on which a plurality of salient pole pieces 4 are mounted in any suitable manner, as by dovetails 5. The pole pieces 4 may be provided with a damper winding of any suitable type, which may consist of damper bars 6 placed in slots in the pole faces and connected by segments 7.

Each of the pole pieces 4 is encircled by a field coil 8. Each of the field coils 8, as shown more clearly in Figs. 2, 3 and 4, consists of a plurality of turns of heavy copper strap wound edgewise to form a multiturn coil. In accordance with the present invention, each coil is wound from two strap conductors 9, each of which is approximately half as thick as the desired thickness of a single turn. The two conductors 9 are placed together with their wider sides facing each other to form a two-ply conductor, and the two-ply conductor thus formed is wound edgewise to form the coil 8, which thus consists of a plurality of turns 10, each of which consists of two plies 9 of half the total thickness of the turn. The coil may be wound on a suitable form in the usual manner, and after it is removed from the form, the two plies or conductors 9 which form each turn are displaced from each other in the direction of the longitudinal axis of the pole piece on which the coil is to be placed, i. e., in the direction of greater length of the coil, so that one conductor 9 extends beyond the other at each end of the coil, as clearly seen in Figs. 2 and 3.

After the coil has been formed in this manner, it may be insulated in the usual way by placing layers of insulating material 11, such as asbestos or mica, between the turns 10 of the coil. The individual conductors 9 of each turn are preferably secured together by means of a thin sheet of asbestos or paper 12 coated with shellac, which is placed between the conductors 9 of each turn to fasten them together and prevent relative movement betwen them after they have been placed in their proper position. The conductors 9 may also be secured together in other suitable ways, such as by brazing them together at intervals, since it is not necessary for them to be insulated from each other as they are connected in parallel.

The coil as a whole may be insulated in any usual or desired manner, as by placing it in a cell 13 of insulating material, such as asbestos, and it is then assembled on the pole piece 4 with washers 14 and 15 of Micarta, or similar insulating material, at the top and bottom. The two plies or conductors 9 which make up the coil are connected in parallel by brazing them together at their ends, and the coils 8 of successive pole pieces 4 are connected together in series in the usual manner, with the polarities of adjacent poles reversed, to make up the complete field winding.

It will be apparent that a coil of this construction has an extending portion at each end of each turn of the coil which serves as a cooling fin to increase the radiation of heat from the coil and thus to improve the ventilation. The two-ply construction of the coil makes this possible, since each ply or individual conductor of each turn extends beyond the other at one end of the coil, and thus each extending portion is spaced from the extending portions of the adjacent turns a sufficient distance to permit an adequate flow of ventilating air between them. Thus, even though the coil may have relatively few turns, adequate ventilation is obtained, since each turn, in effect, has a cooling fin at both ends, so that ample ventilating surfaces are provided. The amount of displacement between the two conductors of each turn, which determines the width of the extending portions, can be made as great as necessary to provide the desired cooling surfaces. Thus, in one typical construction, the coil 8 has twenty-one turns, and each of the individual conductors or plies 9 is approximately ¼ inch thick by 1¾ inches wide, and extends ¾ inch beyond the other ply of the same turn at the end of the coil. These dimensions are given merely by way of example to illustrate the relative proportions which may be involved.

It will be seen that a construction has been provided in which very effective cooling of the field coils of large, salient-pole, synchronous machines is obtained, even though the coils have relatively few turns of thick strap conductors. This improvement in cooling makes it possible to use a minimum number of turns and thus a minimum radial length of the pole pieces, so that a very considerable saving in the amount of copper required is effected, and a substantial reduction in the cost of the machine results.

It is to be understood, of course, that, although a specific embodiment of the invention has been shown and described for purposes of illustration, it is capable of various modifications, and the invention is not limited to the specific details of construction shown, but in its broadest aspects it includes all embodiments and modifications which come within the scope of the appended claims.

We claim as our invention:

1. A dynamo-electric machine having relatively rotatable field and armature members, a plurality of salient pole pieces on the field member, and a field coil on each of said pole pieces, each field coil comprising a plurality of turns of a two-ply strap conductor, the two plies of each turn being displaced so that one ply extends beyond the other at each end of the pole piece.

2. A dynamo-electric machine having relatively rotatable field and armature members, a plurality of salient pole pieces on the field member, a field coil on each of said pole pieces, each field coil comprising a plurality of turns of a two-ply strap conductor, the two plies of each turn being displaced so that one ply extends beyond the other at each end of the pole piece, and means for securing the two plies of each turn together to prevent relative movement therebetween.

3. In a dynamo-electric machine having a field structure with a plurality of salient pole pieces thereon, a field coil on each of said pole pieces, each of said field coils comprising two strap conductors connected together in parallel, said conductors being positioned with their wider sides facing each other and being wound edgewise into a multiturn coil, the two conductors being displaced in each turn of the coil in the direction of the longitudinal axis of the pole piece so that one conductor extends beyond the other at each end of the coil.

4. In a dynamo-electric machine having a field structure with a plurality of salient pole pieces thereon, a field coil on each of said pole pieces, each of said field coils comprising two strap conductors connected together in parallel, said conductors being positioned with their wider sides facing each other and being wound edgewise into a multiturn coil, the two conductors being displaced in each turn of the coil in the direction of the longitudinal axis of the pole piece so that one conductor extends beyond the other at each end of the coil, and means interposed between said two conductors for securing them together.

5. In a dynamo-electric machine having a field structure with a plurality of salient pole pieces thereon, a field coil on each of said pole pieces, each of said field coils comprising two strap conductors connected together in parallel, said conductors being positioned with their wider sides facing each other and being wound edgewise into a multiturn coil, the two conductors being disposed in each turn so that their edges coincide along the long sides of the coil but with one conductor extending beyond the other across each end of the coil.

6. In a dynamo-electric machine having a field structure with a plurality of salient pole pieces thereon, a field coil on each of said pole pieces, each of said field coils comprising two strap conductors connected together in parallel, said conductors being positioned with their wider sides facing each other and being wound edgewise into a multiturn coil, the two conductors being disposed in each turn so that their edges coincide along the long sides of the coil but with one conductor extending beyond the other across each end of the coil, and means interposed between said two conductors for securing them together.

ERNEST I. POLLARD.
JOHN A. BENYAK.